United States Patent
Ajellal et al.

(10) Patent No.: US 12,540,206 B2
(45) Date of Patent: Feb. 3, 2026

(54) ETHYLENE COPOLYMERS WITH IMPROVED MELTING AND GLASS TRANSITION TEMPERATURE

(71) Applicant: Borealis AG, Vienna (AT)

(72) Inventors: Noureddine Ajellal, Kulloo (FI); Mohammad Al-Haj Ali, Kulloo (FI); Henry Sleijster, Echt (NL); Edwin M.F.J. Verdurmen, Weert (NL); Johan Defoer, Mechelen (BE); Jari-Jussi Ruskeeniemi, Kulloo (FI)

(73) Assignee: BOREALIS GMBH, Vienna (AT)

( * ) Notice: Subject to any disclaimer, the term of this patent is extended or adjusted under 35 U.S.C. 154(b) by 526 days.

(21) Appl. No.: 18/021,408

(22) PCT Filed: Sep. 27, 2021

(86) PCT No.: PCT/EP2021/076520
§ 371 (c)(1),
(2) Date: Feb. 15, 2023

(87) PCT Pub. No.: WO2022/069412
PCT Pub. Date: Apr. 7, 2022

(65) Prior Publication Data
US 2023/0287158 A1    Sep. 14, 2023

(30) Foreign Application Priority Data
Sep. 30, 2020  (EP) .................................. 20199150

(51) Int. Cl.
*C08F 210/02*   (2006.01)
*C08L 23/0807*  (2025.01)

(52) U.S. Cl.
CPC ........ *C08F 210/02* (2013.01); *C08L 23/0815* (2013.01)

(58) Field of Classification Search
CPC .... C08F 210/02; C08L 23/08; C08L 23/0807; C08L 23/0815; C08L 2205/02; C08L 2205/025
See application file for complete search history.

(56) References Cited

U.S. PATENT DOCUMENTS

| 2006/0199906 A1 | 9/2006 | Waltom et al. |
| 2013/0029125 A1 | 1/2013 | Tse et al. |

FOREIGN PATENT DOCUMENTS

| EP | 0810087 A2 * | 12/1997 | ........... B32B 27/306 |
| EP | 0992339 A2 * | 4/2000 | ................ C08J 5/18 |
| EP | 1930350 A1 | 6/2008 | |
| EP | 2933275 A1 | 10/2015 | |
| EP | 2933277 A1 | 10/2015 | |
| WO | 0024793 A1 | 5/2000 | |

OTHER PUBLICATIONS

International Search Report of Application No. PCT/EP2021/076520 Dated Jan. 14, 2022.

* cited by examiner

*Primary Examiner* — Jeffrey S Lenihan
(74) *Attorney, Agent, or Firm* — Lippes Mathias LLP

(57) ABSTRACT

The present inventions concerns a copolymer of ethylene and an C3 to C8 alpha-olefin, wherein the copolymer has a density of 870 to 890 kg/m$^3$ measured according to ISO 1183, a MFR$_2$ of 0.5 to 8.0 g/10 min measured according to ISO 1133, wherein the alpha-olefin is present in the copolymer in an amount of 20 to 35 wt.-%, wherein the copolymer has a first melting temperature $T_{m1}$ measured according to ISO 11357-3, characterized in that the first melt point $T_{m1}$ is between 90 and 115° C.

14 Claims, No Drawings

ETHYLENE COPOLYMERS WITH IMPROVED MELTING AND GLASS TRANSITION TEMPERATURE

CROSS REFERENCE TO RELATED APPLICATIONS

This is a 371 of PCT Application No. PCT/EP2021/076520, filed Sep. 27, 2021, which claims the benefit of European Application No. 20199150.2, filed Sep. 30, 2020, the contents of which are incorporated herein in their entirety.

The present invention relates to ethylene copolymers having improved melting temperature, in particular ethylene alpha-olefin copolymers having improved melting temperature. The present invention also relates to such ethylene alpha-olefin copolymers obtained by blending of different ethylene copolymers.

Among polyolefin plastomers and polyolefin elastomers ethylene alpha-olefin copolymers (EOC) are widely used. Ethylene alpha-olefin plastomers are used in a variety of applications, such as sealing, flexible and rigid packaging. Ethylene alpha-olefin copolymers are in particular used as blending partner for impact modification of polypropylene homo- and copolymers. Ethylene alpha-olefin elastomers are used for applications such as interior and exterior car parts, adhesives, cable compounds.

Some state of the art grades of ethylene alpha-olefin copolymers have good properties but do have the disadvantage of exhibiting slow ejection, in particular before or during extrusion of the copolymers, which causes a long cooling time. This behaviour has a negative impact on process economics for several applications. It would thus be advantageous to have improved ethylene alpha-olefin copolymers targeting at the same or a similar grade, however, with faster ejection and thus shorter cooling times. In other words, there is a need in the art for improving the ejection and the cooling time of such targeted ethylene alpha-olefin copolymers.

It is thus an object of the present invention to provide ethylene alpha-olefin copolymers having improved ejection and shorter cooling times.

It is a further object of the invention to provide ethylene alpha-olefin copolymers having improved ejection and shorter cooling times compared to target ethylene alpha-olefin copolymers.

It is a particular object of the invention to provide ethylene alpha-olefin copolymers having improved ejection and shorter cooling times compared to target ethylene alpha-olefin copolymers, but maintaining at the same time the density and the $MFR_2$ of these target ethylene alpha-olefin copolymers.

In the present invention it has been surprisingly found that blending of two different ethylene alpha-olefin copolymers leads to an ethylene alpha-olefin copolymer with significantly higher melting temperature $T_m$ and improved glass transition temperature $T_g$ and at the same maintaining the density and the melt flow rate of the target ethylene alpha-olefin copolymer. The significantly higher melting temperature $T_m$ and improved glass transition temperature $T_g$ advantageously leads to fast ejection and to shorter cooling times.

The invention thus provides a copolymer of ethylene and an C3 to C8 alpha-olefin, wherein the copolymer has a density of 870 to 890 kg/m$^3$ measured according to ISO 1183, a $MFR_2$ of 0.5 to 8.0 g/10 min measured according to ISO 1133, wherein the alpha-olefin is present in the copolymer in an amount of 20 to 35 wt. %, wherein the copolymer has a first melting temperature $T_{m1}$ measured according to ISO 11357-3, characterized in that the first melting temperature $T_{m1}$ is between 90 and 115° C.

The ethylene alpha-olefin copolymers of the invention have several surprising advantages. First, the inventive ethylene alpha-olefin copolymers maintain the density and the $MFR_2$ of their target ethylene alpha-olefin copolymers. Second, they can maintain the weight average molecular weight Mw as well as the comonomer content of their target ethylene alpha-olefin copolymers. Third, while meeting the requirements of density, $MFR_2$, comonomer content and Mw, the inventive ethylene alpha-olefin copolymers have improved melting temperature $T_m$ and improved glass transition temperature $T_g$. The latter properties allow for faster ejection and to shorter cooling times, which in turn improves the process economics for several applications.

The copolymer according to the invention is a copolymer of ethylene as monomer and one comonomer, the comonomer being a C3 to C8 alpha olefin. The term "C3 to C8 alpha-olefin" means that the alpha-olefin comprises from 3 to 8 carbon atoms, and encompasses also C4, C5, C6 and C7 alpha-olefin. C3 denotes propylene, C4 butene, C5 pentene, C6 hexene, C7 heptene and C8 octene.

Preferably, the C3 to C8 alpha olefin is a C8 alpha olefin, i.e. octene. Preferably, the copolymer is a copolymer of ethylene and octene.

The alpha-olefin is present in the copolymer in an amount of preferably 21 to 33 wt. %, more preferably 22.5 to 30 wt. %, and most preferably 24 to 28 wt. %.

Preferably, the copolymer has a density of 875 to 886 kg/m$^3$ measured according to ISO 1183.

The copolymer has a $MFR_2$ preferably of 0.7 to 4.0 g/10 min, more preferably of 0.8 to 3.0 g/10 min, and most preferably of 0.9 to 1.5 g/10 min measured according to ISO 1133.

The copolymer has an $MFR_{21}$ preferably of 25 to 50 g/10 min, more preferably of 28 to 45 g/10 min, and most preferably of 30 to 41 g/10 min measured according to ISO 1133.

The copolymer has a ratio $MFR_{21}/MFR_2$ preferably of 25 to 40, more preferably of 28 to 38, and most preferably of 30 to 35.

The copolymer has an Mw/Mn preferably of 2.6 to 3.3, more preferably of 2.7 to 3.2, and most preferably of 2.8 to 3.1.

The copolymer has an Mw preferably of 85000 to 100000 g/mol, more preferably of 88000 to 98000 g/mol, and most preferably 91000 to 96000 g/mol. Mw denotes the weight average molecular weight.

The inventive copolymer is characterized by a first melting temperature Tmi being between 90 and 115° C. measured according to ISO 11357-3. Preferably, the first melting temperature $T_{m1}$ is between 91 and 110° C., more preferably between 92 and 105° C. and most preferably between 93 and 102° C., measured according to ISO 11357-3.

The copolymer according to the invention preferably has a second melting temperature $T_{m2}$ measured according to ISO 11357-3. The second melting temperature $T_{m2}$ is preferably between 35 and 55° C., more preferably between 37 and 53° C., and most preferably between 39 and 52° C.

The copolymer has a glass transition temperature $T_g$ preferably of −45 to −60° C., more preferably of −48 to −57° C., and most preferably of −52 to −55° C.

The copolymer according to the invention is preferably further characterized by its content of unsaturated groups per 100000 carbon atoms. These unsaturated groups are vinylidene groups ($R_2C=CH_2$), vinyl groups ($RHC=CH_2$), trisubstituted vinylene groups ($R_2C=CHR$) and vinylene groups ($RHC=CHR$).

The copolymer has a vinyl content of preferably 3.5 to 6.5 vinyl groups, more preferably 4.0 to 6.0 vinyl groups, per 100000 carbon atoms.

The copolymer has a vinylidene content of preferably 10.0 to 20.0 vinylidene groups, more preferably 11.0 to 18.0 vinylidene groups, per 100000 carbon atoms.

The copolymer has a trisubstituted vinylene content of preferably 16.0 to 27.0 trisubstituted vinylene groups, more preferably 18.0 to 25.0 trisubstituted vinylene groups, and most preferably 198.0 to 24.5 trisubstituted vinylene groups, per 100000 carbon atoms.

The copolymer has a vinylene content of preferably 7.0 to 14.0 vinylene groups, more preferably 9.0 to 12.0 vinylene groups, per 100000 carbon atoms.

Preparation Methods

The copolymers according to the invention can be preferably produced by blending two ethylene copolymers. Preferably, the copolymer according to the invention is obtained by blending a first ethylene copolymer and a second ethylene copolymer, wherein the first ethylene copolymer has a higher density than the second ethylene copolymer.

Preferably, the first ethylene copolymer and/or the second ethylene copolymer are each produced in a high temperature solution polymerization process at temperatures higher than 100° C. Such a process is essentially based on polymerizing the monomer, i.e. ethylene, and a suitable comonomer, i.e. a C3 to C8 alpha-olefin, preferably octene, in a hydrocarbon solvent, being liquid under the polymerization conditions and in which the resulting polymer is soluble. The polymerization is carried out at a temperature above the melting point of the polymer, as a result of which a polymer solution is obtained. This solution is flashed in multiple steps in order to separate the polymer from the unreacted monomer and the solvent. The solvent is then recovered and recycled in the process.

A solution polymerization process is known for its short reactor residence times (compared to Gas-phase or slurry processes) allowing, thus, very fast grade transitions and significant flexibility in producing a wide product range in a short production cycle.

The used solution polymerization process for each the first ethylene copolymer and the second ethylene copolymer is a high temperature solution polymerization process, using a polymerization temperature of higher than 100° C. Preferably the polymerization temperature is at least 110° C., more preferably at least 150° C. The polymerization temperature can be up to 250° C.

The pressure in the reactor for each the first ethylene copolymer and the second ethylene copolymer depends on the temperature, on one hand, and the type and the amount of the comonomer, on the other hand. The pressure is suitably from 50 to 300 bar, preferably from 60 to 250 bar and more preferably from 70 to 200 bar.

The process includes one or more polymerization reactors. Suitable reactors include unstirred or stirred, spherical, cylindrical and tank-like vessels and recirculating loop reactors and tubular reactors. Such reactors typically include feeding points for monomer, optional comonomer, solvent, catalyst and optional other reactants and additives and withdrawal points for polymer solutions. In addition, the reactors may include heating or cooling means.

The hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

In addition, other components may be added into the reactor. It is known to feed hydrogen into the reactor for controlling the molecular weight of the polymer formed during the polymerization. The use of different antifouling compounds is also already known in the art. In addition, different kinds of activity boosters or activity retarders may be used for controlling the activity of the catalyst.

A preferred process for the preparation of each the first ethylene copolymer and the second ethylene copolymer is a high temperature solution process as described above, preferably at a temperature greater than 100° C., in the presence of a metallocene catalyst system, the metallocene catalyst system comprising, or consisting of, (i) at least one metallocene complex,
(ii) an aluminoxane cocatalyst and/or an boron containing cocatalyst, and
(iii) optionally an aluminium alkyl compound $Al(R^7)_3$, with $R^7$ being a linear or branched $C_2$-$C_8$-alkyl group.

Preferably, the at least one metallocene complex (i) comprises, or consists of, a metallocene complex of formula (I)

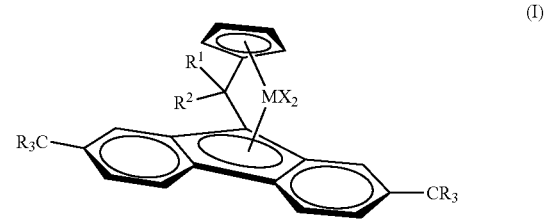

(I)

wherein M is Hf

X is a sigma ligand,

R are the same or different from each other and can be saturated linear or branched $C_1$-$C_{10}$ alkyl, $C_6$-$C_{10}$ aryl, $C_4$-$C_{10}$ heteroaryl, $C_6$-$C_{20}$ alkylaryl or $C_6$-$C_{20}$ arylalkyl groups, which can optionally contain up to 2 heteroatoms or silicon atoms, $R^1$ is a $C_6$-$C_{10}$ aryl or $C_6$-$C_{20}$ alkylaryl group optionally containing up to 2 heteroatoms or silicon atoms or a $C_4$-$C_{10}$ heteroaryl group, $R^2$ is a $C_4$-$C_{20}$ cycloalkyl group, optionally carrying alkyl substituents in beta-positions, of formula (II)

(II)

in which R' can be the same or can be different from each other and can be hydrogen or is defined as R and n is 1 to 17, and/or the metallocene complex (i) comprises, or consists of, a metallocene complex of formula (III)

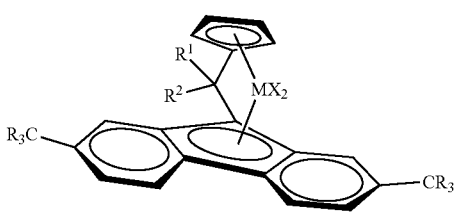

(III)

wherein M is Hf,

X is a sigma ligand,

R are the same or different from each other and can be saturated linear or branched $C_1$-$C_{10}$ alkyl, $C_5$-$C_{10}$ aryl, $C_6$-$C_{20}$ alkylaryl or $C_6$-$C_{20}$ arylalkyl groups, which can optionally contain up to 2 heteroatoms or silicon atoms, $R^1$ is a $C_6$-$C_{20}$-aryl, which can be unsubstituted or substituted by one or up to 5 linear or branched $C_1$-$C_{10}$ alkyl group(s), $R^2$ is an unsaturated linear or cyclic $C_3$-$C_{20}$ alkyl group or a branched $CR^3R^4R^5$ group, wherein $R^3$ is hydrogen or a $C_1$-$C_{20}$ alkyl group and $R^4$ and $R^5$ are the same or are different and can be a $C_1$-$C_{20}$ alkyl group.

Preferably, the at least one metallocene complex of formula (I) is a metallocene complex of formula (Ia)

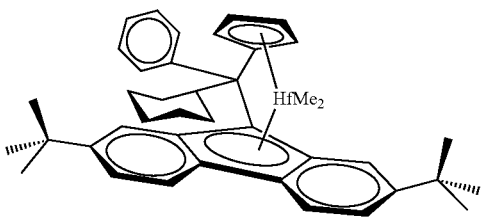

(Ia)

Preferably, the at least one metallocene complex of formula (III) is a metallocene complex of formula (IIIa)

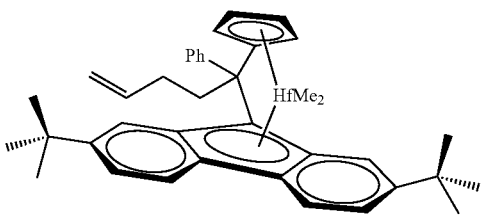

(IIIa)

((Phenyl)(3-buten-1-yl)methylene(cyclopentadienyl) (2,7-di-tert-butylfluoren-9-yl) hafnium dimethyl), Most preferably (Phenyl)(cyclohexyl)methylene(cyclopentadienyl)(2,7-di-tert-butylfluoren-9-yl)hafnium dimethyl) is used as metallocene complex (i).

The above mentioned metallocene complexes of formulae (I) and (III) and their preparation are described in more detail in WO2018108917 and WO2018108918.

As cocatalyst (ii) either an aluminoxane or a boron containing cocatalyst or mixtures therefrom can be used.

The aluminoxane cocatalyst can be one of formula (IV)

(IV)

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (IV).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

Since the aluminoxanes used according to the invention as cocatalysts are not, owing to their mode of preparation, pure compounds, the molarity of aluminoxane solutions hereinafter is based on their aluminium content.

The molar ratio of Al in the aluminoxane to the transition metal of the metallocene may be in the range of 1:1 to 2000:1 mol/mol, preferably 10:1 to 1000:1, more preferably 50:1 to 500:1 mol/mol.

Suitable amounts of cocatalyst will be well known to the skilled man.

In an embodiment of the present invention aluminoxane (ii), preferably methylaluminoxane, and an aluminium alkyl compound of the formula $Al(R^7)_3$ with $R^7$ being a linear or branched $C_2$-$C_8$-alkyl group (iii) are used as cocatalyst.

In this case the cocatalyst is preferably a reaction product of (ii) the aluminoxane, preferably methylaluminoxane with (iii) the aluminium alkyl compound, such as tri-iso-butyl aluminum, tri-iso-hexyl aluminium, tri-n-octyl aluminum, tri-iso-octyl aluminium and the like. The ratio between methylalumoxane and the aluminium alkyl compound can be between 10:1 and 1:10, preferably 5:1 to 1:5, most preferably 3:1 to 1:3 moles of Al in the methylalumoxane to moles of aluminium of the aluminium alkyl compound. The reaction between methylaluminoxane and the aluminium alkyl compound is carried out by mixing the two components in a suitable solvent, which can be aromatic or aliphatic, at a temperature between −50° to +80° C., preferably between 10° and 50° C., more preferably between 20° and 40° C.

Boron based cocatalysts of interest include boron compounds containing a borate 3+ ion, i.e. borate compounds. These compounds generally contain an anion of formula:

$$(Z)_4B^-$$ (V)

where Z is an optionally substituted phenyl derivative, said substituent being a haloC1-6-alkyl or halo group. Preferred options are fluoro or trifluoromethyl. Most preferably, the phenyl group is perfluorinated.

Such ionic cocatalysts preferably contain a non-coordinating anion such as tetrakis(pentafluorophenyl)borate.

Suitable counterions are protonated amine or aniline derivatives or phosphonium ions. These may have the general formula (VI) or (VII):

$$NQ_4^+ \quad (VI)$$

or $$PQ_4^+ \quad (VII)$$

where Q is independently H, $C_{1-6}$-alkyl, $C_{3-8}$ cycloalkyl, phenyl$C_{1-6}$-alkylene- or optionally substituted Ph. Optional substituents may be $C_{1-6}$-alkyl, halo or nitro. There may be one or more than one such substituent. Preferred substituted Ph groups include therefore para-substituted phenyl, preferably tolyl or dimethylphenyl.

It is preferred if at least one Q group is H, thus preferred compounds are those of formula:

$$NHQ_3^+ \quad (VIII)$$

or $$PHQ_3^+ \quad (IX)$$

Preferred phenylC1-6-alkyl-groups include benzyl.

Suitable counterions therefore include: methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, p-bromo-N,N-dimethylanilinium or p-nitro-N,N-dimethylanilinium, especially dimethylammonium or N,N-dimethylanilinium. The use of pyridinium as an ion is a further option.

Phosphonium ions of interest include triphenylphosphonium, triethylphosphonium, diphenylphosphonium, tri(methylphenyl)phosphonium and tri(dimethylphenyl)phosphonium.

A more preferred counterion is trityl ($CPh_3^+$) or analogues thereof in which the Ph group is functionalised to carry one or more alkyl groups. Highly preferred borates of use in the invention therefore comprise the tetrakis(pentafluorophenyl)borate ion.

Preferred ionic compounds which can be used according to the present invention include:
tributylammoniumtetra(pentafluorophenyl)borate,
tributylammoniumtetra(trifluoromethylphenyl)borate,
tributylammoniumtetra-(4-fluorophenyl)borate,
N,N-dimethylcyclohexylammoniumtetrakis-(pentafluorophenyl)borate,
N,N-dimethylbenzylammoniumtetrakis(pentafluorophenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakis(pentafluorophenyl)borate,
triphenylcarbeniumtetrakis(pentafluorophenyl)borate,
ferroceniumtetrakis(pentafluorophenyl)borate.

Preference is given to triphenylcarbeniumtetrakis(pentafluorophenyl) borate,
N,N-dimethylcyclohexylammoniumtetrakis(pentafluorophenyl)borate,
N,N-dimethylbenzylammoniumtetrakis(pentafluorophenyl)borate or
N,N-dimethylaniliniumtetrakis(pentafluorophenyl)borate.

More preferred borates are triphenylcarbeniumtetrakis(pentafluorophenyl) borate and N,N-dimethylaniliniumtetrakis(pentafluorophenyl)borate. N,N-dimethylaniliniumtetrakis(pentafluorophenyl)borate is most preferred.

It is further possible to add an aluminium alkyl compound. Suitable aluminium alkyl compounds are compounds of the formula (VIII) $AlR_3$ with R being a linear or branched $C_2$-$C_8$-alkyl group.

Preferred aluminium alkyl compounds are triethylaluminium, tri-isobutylaluminium, tri-isohexylaluminium, tri-n-octylaluminium and tri-isooctylaluminium.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

Even more preferred is a molar ratio of boron to the metal ion of the metallocene from 1:1 to less than 2:1 mol/mol, e.g from 1:1 to 1.8:1 or 1:1 to 1.5:1.

According to the present invention preferably a boron containing cocatalyst, as described above, is used.

Preferably, the density of the first ethylene copolymer is between 890 and 920 kg/m³, more preferably between 900 and 915 kg/m³, measured according to ISO1183.

Preferably, the density of the second ethylene copolymer is between 840 and 880 kg/m³, more preferably between 850 and 870 kg/m³, measured according to ISO1183.

The first ethylene copolymer has a $MFR_2$ of 0.5 to 8.0 g/10 min, more preferably of 0.7 to 4.0 g/10 min, more preferably of 0.8 to 3.0 g/10 min, and most preferably of 0.9 to 1.5 g/10 min measured according to ISO 1133 and/or the second ethylene copolymer has a $MFR_2$ of 0.5 to 8.0 g/10 min, more preferably of 0.7 to 4.0 g/10 min, more preferably of 0.8 to 3.0 g/10 min, and most preferably of 0.9 to 1.5 g/10 min measured according to ISO 1133.

Preferably, both the first and the second ethylene copolymer have the same alpha-olefin as comonomer, more preferably the alpha-olefin of both the first and the second ethylene copolymer is octene.

The first ethylene copolymer has a melting temperature $T_m$ preferably between 90 and 110° C., measured according to ISO 11357-3.

The second ethylene copolymer has a melting temperature $T_m$ preferably between 30 and 80° C., more preferably between 35 and 75° C., measured according to ISO 11357-3.

Preferably, the alpha-olefin is present in an amount of 8 to 20 wt. % in the first ethylene copolymer, more preferably in an amount of 10 to 18 wt. %.

Preferably, the alpha-olefin is present in an amount of 25 to 45 wt. % in the second ethylene copolymer, more preferably in an amount of 28 to 42 wt. %.

The first and the second ethylene copolymer are blended in a blending ratio, the respective amounts given in wt. %. The blending ratio of the first ethylene copolymer to the second ethylene copolymer is preferably from 25:75 to 55:45 wt. %, more preferably from 30:70 to 70:30 wt. %.

Blending of the first ethylene copolymer as described above with the second ethylene copolymer as described above can be done in three ways.

First, the copolymers according to the invention can be produced in-line in a plant, namely by producing in a parallel reactor configuration the first ethylene copolymer and the second ethylene copolymer and subsequently in-line blending the first ethylene copolymer and the second ethylene copolymer to obtain the ethylene copolymers of the invention. A suitable plant and in-line blending process can be e.g. found in WO2017/108951 A1. In this process two or more reactors operate in parallel configuration, each reactor producing either the same or a different intermediate (co-)

polymer. Downstream of the reactors, the two intermediate (co-)polymers are in-line blended, preferably before extrusion, so as to obtain the final (co-)polymer. This process disclosed in WO2017/108951 A1 can also be used for producing the copolymers according to the invention. In particular, the first ethylene copolymer is produced in one reactor and the second ethylene copolymer in the parallel second reactor, the first and second ethylene copolymer being subsequently in-line blended according to the process of WO02017/108951 A1. With this in-line process, the first and the second ethylene copolymer as well as the final ethylene copolymer according to the invention can be prepared in the plant itself.

Second, either the first or the second ethylene copolymer is produced in a suitable plant, such as that disclosed in WO2017/108951 A1, and the other of the first or the second ethylene copolymer is then added and subsequently blended, preferably before extrusion, so as to obtain the final ethylene copolymer according to the invention. The other of the first or the second ethylene copolymer is not in-line produced, i.e. it is not fluidly added from a polymerisation reactor of the plant, but may for example be preproduced.

Third, blending of the first and second ethylene copolymer can be done off-line. Off-line means first mixing the first and the second ethylene copolymer and subsequent compounding, for example in an extruder. Off-line also means that neither the first nor the second ethylene copolymer are in-line produced and subsequently in-line blended. Mixing can for example by dry blending, such as dry blending of the pellets of the first and the second ethylene copolymer. Alternatively, the first and the second ethylene copolymer can be directly fed into an extruder in which they are mixed and extruded. Preferable extruders are for example twin screw extruders.

EXAMPLE SECTION

1. Measurement Methods a) Melt Flow Rate (MFR) and Flow Rate Ratio (FRR)

The melt flow rate (MFR) is determined according to ISO1133—Determination of the melt mass-flow rate (MFR) and melt volume-flow rate (MVR) of thermoplastics—Part 1: Standard method, and is indicated in g/10 min. The MFR is an indication of flowability, and hence processability, of the polymer. The higher the melt flow rate, the lower the viscosity of the polymer.

The $MFR_2$ of polypropylene is determined at a temperature of 230° C. and a load of 2.16 kg.

The $MFR_2$ of polyethylene is determined at a temperature of 190° C. and a load of 2.16 kg.

The flow rate ratio (FRR) is the $MFR_{21}/MFR_2$.

b) Density

The density of the (co-)polymer was measured according to ISO1183.

c) Comonomer content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. Standard single-pulse excitation was employed utilising the transient NOE at short recycle delays of 3 s and the RS-HEPT decoupling scheme. A total of 1024 (1 k) transients were acquired per spectrum.

Quantitative $^{13}C\{^1H\}$ NMR spectra were processed, integrated and quantitative properties determined using custom spectral analysis automation programs. All chemical shifts are internally referenced to the bulk methylene signal (d+) at 30.00 ppm.

Characteristic signals corresponding to the incorporation of 1-octene were observed and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.3 ppm. This integral is assigned to the unresolved signals corresponding to both *B6 and *bB6B6 sites of isolated (EEOEE) and isolated double non-consecutive (EEOEOEE) 1-octene sequences respectively. To compensate for the influence of the two *bB6B6 sites the integral of the bbB6B6 site at 24.6 ppm is used:

$$O = I_{*B}6 + *bB6B6 - 2*I_{IbbB}6B6$$

Characteristic signals resulting from consecutive 1-octene incorporation, i.e. EEOOEE comonomer sequences, were also observed. Such consecutive 1-octene incorporation was quantified using the integral of the signal at 40.4 ppm assigned to the aaB6B6 sites accounting for the number of reporting sites per comonomer:

$$OO = 2*I_{aaB}6B6$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.6 ppm assigned to the bbB6B6 sites accounting for the number of reporting sites per comonomer:

$$OEO = 2*I_{bbB}6B6$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the aagB6B6B6 sites accounting for the number of reporting sites per comonomer:

$$OOO = 3/2*I_{aagB}6B6B6$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.9 and 32.23 ppm. The 22.84 ppm integral is assigned to the unresolved signals corresponding to both 2B6 and 2S sites of 1-octene and the saturated chain end respectively. The 32.2 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S=(1/2)*(I_{2S+2B6}+I_{3S+3B6}-2*O_{total})$$

The ethylene comonomer content was quantified using the integral of the bulk methylene (bulk) signals at 30.00 ppm. This integral included the D and 4B6 sites from 1-octene as well as the DD sites. The total ethylene comonomer content was calculated based on the bulk integral and compensating for the observed 1-octene sequences and end-groups:

$$E_{total}=(1/2)[I_{bulk}+2*O+1*OO+3*OEO+0*OOO+3*S]$$

It should be noted that compensation of the bulk integral for the presence of isolated triple-incorporation (EE-OOOEE) 1-octene sequences is not required as the number of under and over accounted ethylene units is equal.

The total mole fraction of 1-octene in the polymer was then calculated as:

$$fO=O_{total}/(E_{total}+O_{total})$$

The total comonomer incorporation of 1-octene in weight percent was calculated from the mole fraction in the standard manner:

$$O\ [wt\ \%]=100*(fO*112.21)/((fO*112.21)+((1-fO)*28.05))$$

Further information can be found in the following references:

Klimke, K., Parkinson, M., Piel, C., Kaminsky, W., Spiess, H. W., Wilhelm, M., Macromol. Chem. Phys. 2006; 207:382.
Parkinson, M., Klimke, K., Spiess, H. W., Wilhelm, M., Macromol. Chem. Phys. 2007; 208:2128.
NMR Spectroscopy of Polymers: Innovative Strategies for Complex Macromolecules, Chapter 24, 401 (2011)
Pollard, M., Klimke, K., Graf, R., Spiess, H. W., Wilhelm, M., Sperber, O., Piel, C., Kaminsky, W., Macromolecules 2004; 37:813.
Filip, X., Tripon, C., Filip, C., J. Mag. Resn. 2005, 176, 239
Griffin, J. M., Tripon, C., Samoson, A., Filip, C., and Brown, S. P., Mag. Res. in Chem. 2007 45, S1, S198
Castignolles, P., Graf, R., Parkinson, M., Wilhelm, M., Gaborieau, M., Polymer 50 (2009) 2373
Zhou, Z., Kuemmerle, R., Qiu, X., Redwine, D., Cong, R., Taha, A., Baugh, D. Winniford, B., J. Mag. Reson. 187 (2007) 225
Busico, V., Carbonniere, P., Cipullo, R., Pellecchia, R., Severn, J., Talarico, G., Macromol. Rapid Commun. 2007, 28, 1128
J. Randall, Macromol. Sci., Rev. Macromol. Chem. Phys. 1989, C29, 201.
Qiu, X., Redwine, D., Gobbi, G., Nuamthanom, A., Rinaldi, P., Macromolecules 2007, 40, 6879
Liu, W., Rinaldi, P., McIntosh, L., Quirk, P., Macromolecules 2001, 34, 4757 d) Unsaturation

Quantitative nuclear-magnetic resonance (NMR) spectroscopy was used to quantify the content of unsaturated groups present in the polymers.

Quantitative $^1$H NMR spectra recorded in the solution-state using a Bruker Avance III 400 NMR spectrometer operating at 400.15 MHz. All spectra were recorded using a $^{13}$C optimised 10 mm selective excitation probehead at 125° C. using nitrogen gas for all pneumatics. Approximately 200 mg of material was dissolved in 1,2-tetrachloroethane-d$_2$ (TCE-d$_2$) using approximately 3 mg of Hostanox 03 (CAS 32509-66-3) as stabiliser. Standard single-pulse excitation was employed utilising a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidene groups. All chemical shifts were indirectly referenced to TMS at 0.00 ppm using the signal resulting from the residual protonated solvent at 5.95 ppm.

Characteristic signals corresponding to the presence of terminal aliphatic vinyl groups (R-CH=CH$_2$) were observed and the amount quantified using the integral of the two coupled inequivalent terminal CH$_2$ protons (Va and Vb) at 4.95, 4.98 and 5.00 and 5.05 ppm accounting for the number of reporting sites per functional group:

$$Nvinyl=IVab/2$$

When characteristic signals corresponding to the presence of internal vinylidene groups (RR'C=CH$_2$) were observed the amount is quantified using the integral of the two CH$_2$ protons (D) at 4.74 ppm accounting for the number of reporting sites per functional group:

$$Nvinylidene=ID/2$$

When characteristic signals corresponding to the presence of internal cis-vinylene groups (E-RCH=CHR'), or related structure, were observed the amount is quantified using the integral of the two CH protons (C) at 5.39 ppm accounting for the number of reporting sites per functional group:

$$Ncis=IC/2$$

When characteristic signals corresponding to the presence of internal trans-vinylene groups (Z-RCH=CHR') were observed the amount is quantified using the integral of the two CH protons (T) at 5.45 ppm accounting for the number of reporting sites per functional group:

$$Ntrans=IT/2$$

When characteristic signals corresponding to the presence of internal trisubstituted-vinylene groups (RCH=CHR'R''), or related structure, were observed the amount is quantified using the integral of the CH proton (Tris) at 5.14 ppm accounting for the number of reporting sites per functional group:

$$Ntris=ITris$$

The Hostanox 03 stabliser was quantified using the integral of multiplet from the aromatic protons (A) at 6.92, 6.91, 6.69 and at 6.89 ppm and accounting for the number of reporting sites per molecule:

$$H=IA/4$$

As is typical for unsaturation quantification in polyolefins the amount of unsaturation was determined with respect to total carbon atoms, even though quantified by 1H NMR spectroscopy. This allows direct comparison to other microstructure quantities derived directly from 13C NMR spectroscopy.

The total amount of carbon atoms was calculated from integral of the bulk aliphatic signal between 2.85 and −1.00 ppm with compensation for the methyl signals from the stabiliser and carbon atoms relating to unsaturated functionality not included by this region:

$$NCtotal=(Ibulk-42*H)/2+2*Nvinyl+2*Nvinylidene+2*Ncis+2*Ntrans+2*Ntris$$

The content of unsaturated groups (U) was calculated as the number of unsaturated groups in the polymer per thousand total carbons (kCHn):

U=1000*N/NCtotal                                                                       (5)

The total amount of unsaturated group was calculated as the sum of the individual observed unsaturated groups and thus also reported with respect per thousand total carbons:

Utotal=Uvinyl+Uvinylidene+Ucis+Utrans+Utris

The relative content of a specific unsaturated group (U) is reported as the fraction or percentage of a given unsaturated group with respect to the total amount of unsaturated groups:

[U]=Ux/Utotal

Further information can be found in the following references:
He, Y., Qiu, X, and Zhou, Z., Mag. Res. Chem. 2010, 48, 537-542. Busico, V. et. al. Macromolecules, 2005, 38 (16), 6988-6996 e) Determination of the Molecular Weight Averages, Molecular Weight Distribution Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \qquad (1)$$

$$M_w = \frac{\sum_{i=1}^{N} (A_i \times M_i)}{\sum_{i=1}^{N} A_i} \qquad (2)$$

$$M_z = \frac{\sum_{i=1}^{N} (A_i \times M_i^2)}{\sum_{i=1}^{N} (A_i/M_i)} \qquad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with a multiple band infrared detector model IR5 (PolymerChar, Valencia, Spain), equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. at a constant flow rate of 1 mL/min. 200 µL of sample solution was injected per analysis. Data collection was performed by using PolymerChar GPC-one software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}$=19×10-3 mL/g, $α_{PS}$=0.655

$K_{PE}$=39×10-3 mL/g, $α_{PE}$=0.725

A third order polynomial fit was used to fit the calibration data.

All samples were prepared in the concentration range of 0.5 to 1 mg/ml and dissolved at 160° C. for 3 hours under continuous gentle shaking.

f) Melting temperature ($T_m$) and Crystallization Temperature ($T_c$)

Experiments were performed with a TA Instruments Q200, calibrated with Indium, Zinc, Tin and according to ISO 11357-3. Roughly 5 mg of material were placed in a pan and tested at 10° C./min throughout the experiments, under 50 mL/min nitrogen flow, with lower and higher temperatures of −30° C. and 180° C. respectively. Only the second heating run was considered for the analysis. The melting temperature Tm is defined as the temperature of the main peak of the thermogram, while the melting enthalpy (ΔHm) is calculated by integrating between 10° C. and the end of the thermogram, typically Tm+15° C. The running integral in this range is also calculated.

g) Glass Transition Temperature (Tg)

The glass transition temperature Tg is determined by dynamic mechanical analysis according to ISO 6721-7. The measurements are done in torsion mode on compression moulded samples (40×10×1 mm3) between −100° C. and +150° C. with a heating rate of 2° C./min and a frequency of 1 Hz.

2. Materials a) Comparative Example 1 (CE1)
   CE1 is an ethylene based octene-1 plastomer (octene content 25.8 wt. %) having an MFR2 of 1.1 g/10 min, a density of 882.3 kg/m³, and a melting temperature Tm of 73° C., commercially available from Borealis. CE1 was produced in a solution polymerisation process using a metallocene catalyst.

b) Copolymer A is an ethylene based octene-1 plastomer (octene content 11.9 wt. %) having an MFR2 of 1.1 g/10 min, a density of 910 kg/m³ and a melting temperature $T_m$ of 106° C.

c) Copolymer B is an ethylene based octene-1 plastomer (octene content 16.0 wt. %) having an MFR2 of 1.1 g/10 min, a density of 902 kg/m³ and a melting temperature $T_m$ of 97° C.

d) Copolymer C is an ethylene based octene-1 elastomer (octene content 37.1 wt. %) having an MFR2 of 1.0 g/10 min, a density of 862 kg/m³ and a melting temperature $T_m$ of 35° C.

e) Copolymer D is an ethylene based octene-1 elastomer (octene content 31.5 wt. %) having an MFR2 of 1.0 g/10 min, a density of 870 kg/m³ and a melting temperature $T_m$ of 56° C.

Copolymers A to D were produced with Borealis proprietor Borceed™ solution polymerization technology, in the present of metallocene catalyst (phenyl)(cyclohexyl) methylene (cyclopentadienyl) (2,7-di-tert-butylfluorenyl) hafnium dimethyl and N,N-Dimethylanilinium Tetrakis(pentafluorophenyl)borate (AB) (CAS 118612-00-3) was used, commercially available from Boulder, as cocatalyst.

The polymerization conditions, were selected in such a way that the reacting system is one liquid phase (T between 150 and 200° C.; 60 to 150 bar).

3. Results

Blending of the respective material was done using Prism TSE-16, a 16 mm co-rotating twin screw extruder with L/D 25, with throughput of approximately 1.4 kg/h. Temperature profile was set to 180-200° C. and the machine was operated at 250 rpm. Samples were produced by mixing a dry blend of base resin pellets and extruding said mixture. Around 2.5 kg of dry blend was fed to hopper for the batch and after stabilisation around 2.0 kg of the final extruded blend was collected.

The inventive examples IE1-1 to IE1-3 are blends of two copolymers in specific blend ratios. Results are provided in Table 1 below.

TABLE 1

| Results | | | | |
|---|---|---|---|---|
| | CE1 | IE1-1 | IE1-2 | IE1-3 |
| Blend ratio | — | 42 wt. % Copo. A 58 wt. % Copo. C | 30 wt. % Copo. A 70 wt. % Copo. D | 50 wt. % Copo. B 50 wt. % Copo. C |
| C8 content, wt. % | 25.8 | 27.6 | 26.8 | 24.6 |
| Density, kg/m$^3$ | 882.3 | 878.6 | 882.7 | 883.3 |
| $M_w$, g/mol | 89600 | 95050 | 95050 | 92200 |
| $M_w/M_n$ | 2.7 | 3.03 | 2.90 | 2.82 |
| $MFR_2$, g/10 min | 1.11 | 1.15 | 1 | 1.04 |
| $MFR_{21}$, g/10 min | 35.08 | 40.23 | 30.69 | 35.38 |
| $MFR_{21}/MFR_2$ | 31.60 | 34.98 | 30.69 | 34.02 |
| $T_{m1}$, °C. | 73.26 | 101.09 | 99.59 | 94.09 |
| $T_{m2}$, °C. | 55.96 | 39.88 | 51.23 | 39.21 |
| $T_g$, °C. | −49.2 | −53.8 | −52.77 | −54.82 |
| Vinylidene, 100kCHn | 17.0 | 13.8 | 13.1 | 12.6 |
| Vinyl, 100kCHn | 8.3 | 4.7 | 5.4 | 5.7 |
| Trisubst, 100kCHn | 28.4 | 19.7 | 23.7 | 21.7 |
| Vinylene, 100kCHn | 9.9 | 10.8 | 11.4 | 10.4 |

The above results show that blending two different copolymers targeting an existing product (CE1) leads to copolymers (IE1-1 to IE1-3) with significantly better melting temperature $T_m$ as well as Tg at comparable density, melt flow rate, $M_w$ and octene comonomer content.

The invention claimed is:

1. Copolymer of ethylene and an C3 to C8 alpha-olefin, wherein the copolymer has a density of 870 to 890 kg/m$^3$ measured according to ISO 1183, a $MFR_2$ of 0.5 to 8.0 g/10 min measured according to ISO 1133, wherein the alpha-olefin is present in the copolymer in an amount of 20 to 35 wt. %, wherein the copolymer has a first melting temperature $T_{m1}$ measured according to ISO 11357-3, characterized in that the first melt temperature $T_{m1}$ is between 9° and 110° C.; and in that the copolymer has a second melting temperature $T_{m2}$ measured according to ISO 11357-3, wherein the second melting temperature $T_{m2}$ is between 35 and 55° C.

2. The copolymer according to claim 1, wherein the copolymer is a copolymer of ethylene and octene.

3. The copolymer according to claim 1, wherein the copolymer has a $MFR_2$ of 0.7 to 4.0 g/10 min measured according to ISO 1133.

4. The copolymer according to claim 1, wherein the copolymer has an $MFR_{21}$ of 25 to 50 g/10 min measured according to ISO 1133.

5. The copolymer according to claim 1, wherein the copolymer has a ratio $MFR_{21}/MFR_2$ of 25 to 40 measured according to ISO 1133.

6. The copolymer according to claim 1, wherein the copolymer has an Mw/Mn of 2.6 to 3.3 determined by Gel Permeation Chromatography.

7. The copolymer according to claim 1, wherein the copolymer has an Mw of 85000 to 100000 g/mol determined by Gel Permeation Chromatography.

8. The copolymer according to claim 1, wherein the copolymer has a glass transition temperature $T_g$ of −45 to −60° C. measured according to ISO 6721-7.

9. The copolymer according to claim 1, wherein the copolymer has a vinyl content of 3.5 to 6.5 vinyl groups per 100000 carbon atoms measured with $^1$H NMR.

10. The copolymer according to claim 1, wherein the copolymer has a vinylidene content of 10.0 to 20.0 vinylidene groups per 100000 carbon atoms measured with $^1$H NMR.

11. The copolymer according to claim 1, wherein the copolymer has a trisubstituted vinylene content of 16.0 to 27.0 trisubstituted vinylene groups per 100000 carbon atoms measured with $^1$H NMR.

12. The copolymer according to claim 1, wherein the copolymer has a vinylene content of 7.0 to 14.0 vinylene groups per 100000 carbon atoms measured with $^1$H NMR.

13. The copolymer according to claim 1, wherein the copolymer is obtained by blending a first ethylene copolymer and a second ethylene copolymer, wherein the first ethylene copolymer has a higher density than the second ethylene copolymer.

14. The copolymer according to claim 13, wherein a blending ratio of the first ethylene copolymer to the second ethylene copolymer is from 25:75 to 55:45 wt. %.

\* \* \* \* \*